United States Patent
Takahashi

(10) Patent No.: US 10,038,221 B2
(45) Date of Patent: Jul. 31, 2018

(54) SECONDARY BATTERY AND METHOD FOR RESTORING CAPACITY OF SECONDARY BATTERY

(71) Applicant: SEMICONDUCTOR ENERGY LABORATORY CO., LTD., Atsugi-shi, Kanagawa-ken (JP)

(72) Inventor: Minoru Takahashi, Nagano (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 15/416,637

(22) Filed: Jan. 26, 2017

(65) Prior Publication Data

US 2017/0149099 A1   May 25, 2017

Related U.S. Application Data

(62) Division of application No. 14/267,060, filed on May 1, 2014, now Pat. No. 9,559,384.

(30) Foreign Application Priority Data

May 15, 2013   (JP) ................................ 2013-102780

(51) Int. Cl.
*H01M 10/42* (2006.01)
*H01M 2/36* (2006.01)
(Continued)

(52) U.S. Cl.
CPC ......... *H01M 10/4242* (2013.01); *H01M 2/20* (2013.01); *H01M 2/361* (2013.01);
(Continued)

(58) Field of Classification Search
CPC .... H01M 10/4242; H01M 2/20; H01M 2/361; H01M 2/362; H01M 10/0525; H01M 10/4257; H01M 10/44
See application file for complete search history.

(56) References Cited

U.S. PATENT DOCUMENTS

| 4,153,759 A | 5/1979 | Murata et al. |
| 2003/0091503 A1* | 5/2003 | Rosenfeld ........... B60L 11/1809 423/657 |

(Continued)

FOREIGN PATENT DOCUMENTS

| JP | 2002-324585 A | 11/2002 | |
| JP | WO2012/124211 | * 9/2012 | ........... H01M 10/42 |
| JP | 2012-195055 A | 10/2012 | |

*Primary Examiner* — Oi K Conley
(74) *Attorney, Agent, or Firm* — Nixon Peabody LLP; Jeffrey L. Costellia

(57) ABSTRACT

An exterior body of a secondary battery includes an insertion portion for insertion of a third electrode including metal lithium. An injection and expelling portion through which an electrolyte solution can be replaced is further provided. Specifically, a nonaqueous secondary battery includes a positive electrode, a negative electrode, an electrolyte solution, a separator, and an exterior body covering the positive electrode, the negative electrode, and the electrolyte solution. The exterior body includes a positive electrode terminal to which the positive electrode is electrically connected, a negative electrode terminal to which the negative electrode is electrically connected, and an insertion portion for insertion of a third electrode including metal lithium.

21 Claims, 8 Drawing Sheets

(51) Int. Cl.
*H01M 10/0525* (2010.01)
*H01M 2/20* (2006.01)
*H01M 10/44* (2006.01)
*H02J 7/00* (2006.01)

(52) U.S. Cl.
CPC ........... *H01M 2/362* (2013.01); *H01M 2/364* (2013.01); *H01M 10/0525* (2013.01); *H01M 10/4257* (2013.01); *H01M 10/44* (2013.01); H01M 2010/4271 (2013.01); H02J 7/0068 (2013.01)

(56) References Cited

U.S. PATENT DOCUMENTS

| | | |
|---|---|---|
| 2008/0187825 A1 | 8/2008 | Kawabata et al. |
| 2008/0203816 A1* | 8/2008 | Fujita .................. H02J 7/0063 307/48 |
| 2010/0266878 A1 | 10/2010 | Eilertsen |
| 2011/0287341 A1 | 11/2011 | Inoue et al. |
| 2011/0300437 A1 | 12/2011 | Yi |
| 2012/0002349 A1 | 1/2012 | Ito et al. |
| 2012/0308891 A1 | 12/2012 | Todoriki et al. |
| 2012/0328917 A1* | 12/2012 | Sakashita ............ H01M 10/052 429/82 |
| 2014/0186686 A1 | 7/2014 | Takahashi et al. |

* cited by examiner

SECONDARY BATTERY AND METHOD FOR RESTORING CAPACITY OF SECONDARY BATTERY

BACKGROUND OF THE INVENTION

1. Field of the Invention

The present invention relates to an object (a product including a machine, a manufacture, and a composition of matter) and a method (a process including a simple method and a production method). In particular, one embodiment of the present invention relates to a nonaqueous secondary battery, or relates to a method for restoring a capacity of a nonaqueous secondary battery.

2. Description of the Related Art

Lithium-ion secondary batteries have advantageous effects such as high output and high energy density and have been frequently used for a variety of uses such as portable electronic devices, next-generation clean energy vehicles including hybrid electric vehicles (HEVs) and electric vehicles (EVs), and stationary power storage devices. In particular, development of comparatively large-sized secondary batteries for vehicles and stationary power storage devices, which can be used for a long period of time, has been needed along with a growing demand for energy saving in recent years.

A lithium-ion secondary battery, which is one of nonaqueous secondary batteries, includes a positive electrode, a negative electrode, a separator, a nonaqueous electrolyte solution, and an exterior body covering these components. In lithium-ion secondary batteries, positive electrodes and negative electrodes are generally used; the positive electrodes each include a positive electrode current collector made of aluminum or the like and a positive electrode mix which includes a positive electrode active material capable of occluding and releasing lithium ions and which is applied to both surfaces of the positive electrode current collector, and the negative electrodes each include a negative electrode current collector made of copper or the like and a negative electrode mix which includes a negative electrode active material capable of occluding and releasing lithium ions and which is applied to both surfaces of the negative electrode current collector. These positive and negative electrodes are insulated from each other by a separator provided therebetween, and the positive electrode and the negative electrode are electrically connected to a positive electrode terminal and a negative electrode terminal, respectively, which are provided for the exterior body. The exterior body has a certain shape such as a cylindrical shape or a rectangular shape.

When a secondary battery is used for a long period of time, e.g., for several years or for more than ten years or more, a problem of a decrease in capacity arises. A cause of the decrease in the capacity of a lithium-ion secondary battery is a reduction in lithium ions contributing to a battery reaction.

There are several causes of the reduction in lithium ions contributing to a battery reaction. One of them is formation of a coating film on a surface of a negative electrode. Specifically, an electrolyte solution is decomposed at the interface between the negative electrode and the electrolyte solution, and a coating film containing lithium is formed on a surface of the negative electrode. Formation of the coating film allows a stable battery reaction; however, excessive formation of the coating film is not preferable because lithium ions contributing to a battery reaction are reduced.

The following is another cause of the reduction in lithium ions contributing to a battery reaction. By rapid charging or the like, metal lithium is deposited on an active material and a surface of an active material and separated from a current collector.

In normal low-rate charging, metal lithium is deposited on an active material and a surface of an active material. In the case where conductivity is kept between the active material and the metal lithium, the deposited metal lithium slowly disappears in discharging. However, the metal lithium expands and shrinks when the active material, particularly the negative electrode active material, occludes and releases a lithium ion. Therefore, when rapid charging is performed or deposition of metal lithium is repeatedly performed for a long period of time, the deposited metal lithium loses its conductivity with the current collector, leading to separation of the metal lithium in some cases.

The separated active material or metal lithium causes clogging of the separator, whereby the diffusibility of lithium ions is reduced and lithium ions are concentrated in the periphery of the clogging, leading to further deposition of metal lithium and a further decrease in the capacity of the secondary battery.

Another cause of the decrease in the capacity of a lithium-ion secondary battery is deterioration of an electrolyte solution. An electrolyte solution which normally functions is reduced by decomposition of the electrolyte solution at the interface between an electrode and the electrolyte solution, vaporization of the electrolyte solution due to heat generated in a battery reaction, and the like, reducing the diffusibility of lithium ions.

The reduction in the diffusibility of lithium ions causes further deposition of metal lithium as described above, leading to a vicious cycle.

In order to suppress the above-described reduction in lithium ions contributing to a battery reaction, various methods have been studied. For example, a method for predoping a negative electrode with lithium before assembly of a secondary battery is known. As another method, a metal lithium electrode is provided in advance as a third electrode inside a secondary battery, and lithium ions are supplied from the metal lithium electrode when its capacity is decreased (Patent Document 1). Furthermore, in another method under study, a metal lithium electrode which has been installed in a cassette case is inserted into a secondary battery to supply lithium ions when its capacity is decreased (Patent Document 2).

REFERENCES

Patent Documents

[Patent Document 1] Japanese Published Patent Application No. 2012-195055
[Patent Document 2] Japanese Published Patent Application No. 2002-324585

SUMMARY OF THE INVENTION

However, in a structure where a metal lithium electrode is provided in advance inside an exterior body of a secondary battery as disclosed in Patent Document 1, there is a concern that metal lithium soaked in an electrolyte solution for a long period of time may deteriorate.

Metal lithium reacts with water easily. Hence, in a method in which a metal lithium electrode installed in a cassette case is inserted as disclosed in Patent Document 2, an insertion operation needs to be performed in a dry room, which is unfavorable because it increases the cost of maintenance.

Another cause of the decrease in capacity of a secondary battery is deterioration of an electrolyte solution as described above.

Thus, one object of one embodiment of the present invention is to provide a secondary battery to which lithium can be supplied more easily from the outside when its capacity is decreased. Another object is to provide a secondary battery whose electrolyte solution can be replaced when its capacity is decreased. Another object is to restore a capacity of a secondary battery by supplying lithium from the outside and replacing an electrolyte solution when its capacity is decreased.

In order to achieve any of the above objects, in one embodiment of the present invention, an insertion portion for insertion of a third electrode including metal lithium is provided in an exterior body of a secondary battery. Furthermore, an injection, and expelling portion through which an electrolyte solution can be replaced is provided.

One embodiment of the present invention is a nonaqueous secondary battery including a positive electrode, a negative electrode, a separator, an electrolyte solution, and an exterior body covering the positive electrode, the negative electrode, the separator, and the electrolyte solution; the exterior body includes a positive electrode terminal to which the positive electrode is electrically connected, a negative electrode terminal to which the negative electrode is electrically connected, and an insertion portion for insertion of a third electrode including metal lithium.

Another embodiment of the present invention is a nonaqueous secondary battery including a positive electrode, a negative electrode, a separator, an electrolyte solution, and an exterior body covering the positive electrode, the negative electrode, the separator, and the electrolyte solution; the exterior body includes a positive electrode terminal to which the positive electrode is electrically connected, a negative electrode terminal to which the negative electrode is electrically connected, an insertion portion for insertion of a third electrode including metal lithium, and an electrolyte solution injection and expelling portion through which the electrolyte solution can be injected or expelled.

In any of the above, it is preferable that the nonaqueous secondary battery be assumed to be installed in at least one installation direction, a groove having a surface parallel to a surface of the positive electrode and a surface of the negative electrode be provided in at least a part of the separator, and the longitudinal direction of the groove be perpendicular to a horizontal surface when the nonaqueous secondary battery is installed in the installation direction.

Another embodiment of the present invention is a method for restoring a capacity of a nonaqueous secondary battery including a positive electrode, a negative electrode, a separator, an electrolyte solution, and an exterior body covering the positive electrode, the negative electrode, the separator, and the electrolyte solution, including the steps of detecting a decrease in capacity of the secondary battery using a detection means and increasing the amount of lithium in the whole of the secondary battery in such a manner that a third electrode including metal lithium is inserted through the insertion portion provided for the exterior body and a voltage is applied to the third electrode including the metal lithium and the negative electrode to transfer a lithium ion from the third electrode including the metal lithium to the negative electrode.

Another embodiment of the present invention is a method for restoring a capacity of a nonaqueous secondary battery including a positive electrode, a negative electrode, a separator, an electrolyte solution, and an exterior body covering the positive electrode, the negative electrode, the separator, and the electrolyte solution, including the steps of detecting a decrease in capacity of the secondary battery using a detection means and increasing the amount of lithium in the whole of the secondary battery in such a manner that a third electrode including metal lithium is inserted through the insertion portion provided in the exterior body and a voltage is applied to the third electrode including the metal lithium and the positive electrode to transfer a lithium ion from the third electrode including the metal lithium to the positive electrode.

Another embodiment of the present invention is a method for restoring a capacity of a nonaqueous secondary battery including a positive electrode, a negative electrode, a separator, an electrolyte solution, and an exterior body covering the positive electrode, the negative electrode, the separator, and the electrolyte solution, including the steps of detecting a decrease in a capacity of the secondary battery using a detection means, replacing the electrolyte solution through an insertion portion provided for the exterior body, and increasing the amount of lithium in the whole of the secondary battery in such a manner that a third electrode including metal lithium is inserted through the insertion portion provided for the exterior body and a voltage is applied to the third electrode including the metal lithium and one of the negative electrode and the positive electrode to transfer a lithium ion from the third electrode including the metal lithium to one of the negative electrode and the positive electrode.

In one embodiment of the present invention, a secondary battery to which lithium can be supplied more easily from the outside when its capacity is decreased can be provided, a secondary battery whose electrolyte solution can be replaced when its capacity is decreased can be provided, or a capacity of a secondary battery can be restored by supplying lithium from the outside and replacing an electrolyte solution when its capacity is decreased.

DETAILED DESCRIPTION OF THE INVENTION

Figure 1A:
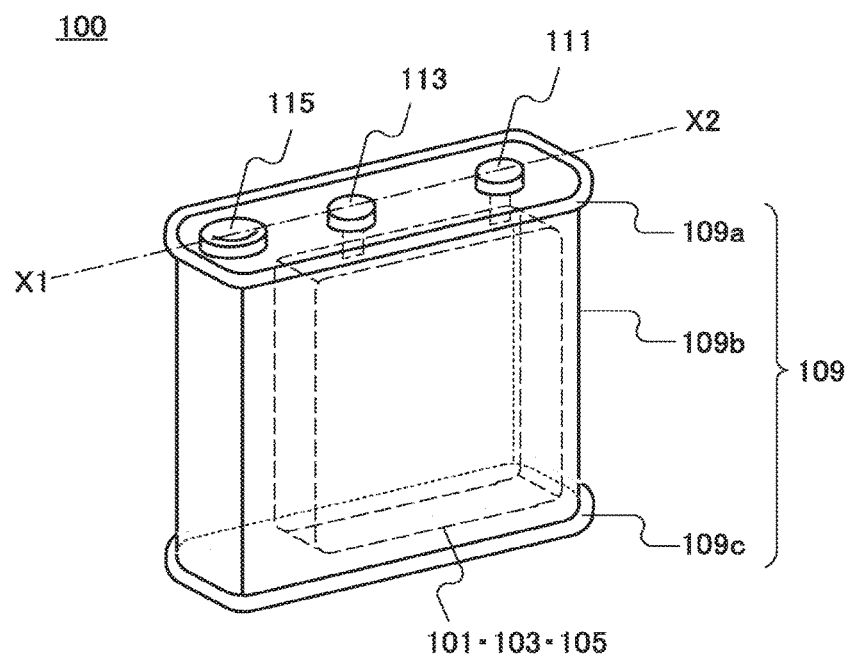
FIGS. 1A and 1B illustrate a secondary battery of one embodiment of the present invention.

Embodiments of the present invention will be described in detail below with reference to the accompanying drawings. Note that the present invention is not limited to the description in these embodiments, and it is easily understood by those skilled in the art that modes and aspects of the present invention can be modified in various ways. Accordingly, the present invention should not be interpreted as being limited to the content of the embodiments below.

Note that in each drawing described in this specification, the size of each component, such as the thickness and the size of a positive electrode, a negative electrode, an active material layer, an exterior body, an insertion portion, an injection and expelling portion, and the like is exaggerated for clarity in some cases. Therefore, each component is not necessarily limited to that size and not necessarily limited in size relative to another component.

Ordinal numbers such as "first", "second", and "third" are used for convenience and do not denote the order of steps or the stacking order of layers. Therefore, for example, description can be made even when "first" is replaced with "second" or "third", as appropriate. In addition, the ordinal numbers in this specification and the like are not necessarily the same as those which specify one embodiment of the present invention.

Note that in the structures of the present invention described in this specification and the like, the same portions or portions having similar functions in different drawings are denoted by the same reference numerals, and description of such portions is not repeated. Further, the same hatching pattern is applied to portions having similar functions, and the portions are not especially denoted by reference numerals in some cases.

Note that in this specification and the like, a charging rate C refers to the rate at which a secondary battery is charged. For example, the charging rate in the case of charging a battery having a capacity of 1 Ah with 1 A is 1 C. In addition, a discharging rate C refers to the rate at which a secondary battery is discharged. For example, the discharging rate in the case of discharging a battery having a capacity of 1 Ah with 1 A is 1 C.

The descriptions in embodiments for carrying out the invention can be combined with each other as appropriate.
(Embodiment 1)

In this embodiment, an example of a nonaqueous secondary battery of one embodiment of the present invention is described with reference to FIGS. 1A and 1B, FIGS. 2A to 2C, FIGS. 3A to 3D, FIGS. 4A to 4E, FIGS. 5A to 5G, and FIGS. 6A and 6B.
<Secondary Battery>

Figure 1B:
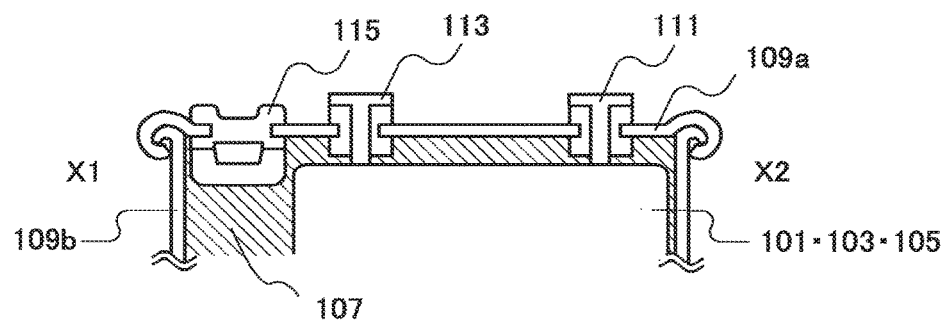

First, an example of an exterior body of a secondary battery of one embodiment of the present invention is mainly described with reference to FIGS. 1A and 1B. FIG. 1A is a perspective view of a secondary battery 100. FIG. 1B shows a part of a cross-sectional structure taken along dashed-dotted line X1-X2 in FIG. 1A. The secondary battery 100 includes a positive electrode 101, a negative electrode 105, a separator 103 between the positive electrode 101 and the negative electrode 105, and an electrolyte solution 107. The secondary battery 100 further includes an exterior body 109 covering the positive electrode 101, the negative electrode 105, the separator 103, and the electrolyte solution 107. In FIGS. 1A and 1B, the positive electrode 101, the separator 103, and the negative electrode 105 are not shown in detail but are collectively indicated by a box for simplification of the drawings. The details of the positive electrode 101, the separator 103, and the negative electrode 105 will be described with reference to FIGS. 5A to 5G and FIGS. 6A and 6B.

The exterior body 109 includes a positive electrode terminal 113 to which the positive electrode 101 is electrically connected, a negative electrode terminal 111 to which the negative electrode 105 is electrically connected, and an insertion portion 115 for insertion of a third electrode 117 including metal lithium, which is to be described later. The exterior body 109 may be formed of a combination of an upper exterior body 109a, a side exterior body 109b, and a lower exterior body 109c. As shown in FIG. 1B, the upper exterior body 109a and the side exterior body 109b are preferably crimped. Similarly, the side exterior body 109b and the lower exterior body 109c are preferably crimped.

The insertion portion 115 is preferably formed using a material having elasticity. Here, the material having elasticity refers to a material having a high elastic limit. Examples of the material having elasticity include various kinds of synthetic rubber such as NBR, SBR, fluororubber, and silicone rubber, natural rubber, plastic such as an acrylic copolymer, a structure using a carbon nanotube, and a composite material of any of these.

For example, the positive electrode terminal 113, the negative electrode terminal 111, and the insertion portion 115 can be provided for the upper exterior body 109a by outsert molding, though there is no particular limitation on a method for forming the positive electrode terminal 113, the negative electrode terminal 111, and the insertion portion 115.

As shown in FIG. 1B, the insertion portion 115 may have a structure including a space inside. Such a structure can prevent leakage of the electrolyte solution and mixing of the atmospheric air into the exterior body at the time of inserting the third electrode 117 to be described later.

It is preferable that the positive electrode 101, the separator 103, and the negative electrode 105 be formed in a region except a part of a space under the insertion portion 115 so that a space that is necessary for the insertion of the third electrode 117 described later is obtained.
<Lithium Ion Supply Method>

An example of a lithium ion supply method, which is a method for restoring a capacity of a secondary battery of one embodiment of the present invention, is described with reference to FIGS. 2A to 2C. In one embodiment of the present invention, the third electrode 117 including metal lithium 117a is inserted through the insertion portion 115, and a lithium ion is supplied from the metal lithium 117a to the positive electrode 101 or the negative electrode 105 to restore the capacity of the secondary battery 100.

Specifically, first, a decrease in the capacity of the secondary battery 100 is detected using a detecting unit. The decrease in the capacity of the secondary battery 100 can be detected by measuring a current and a voltage during charge and discharge.

In the case where the capacity of the secondary battery is decreased, a lithium ion is supplied to the positive electrode 101 or the negative electrode 105. Before the supply of the lithium ion, the third electrode 117 including the metal lithium 117a is prepared as shown in FIG. 2A. The metal lithium 117a is provided inside an outer tube 117c of the third electrode 117. With such a structure where the metal lithium 117a is provided inside the outer tube 117c, the metal lithium 117a can be prevented from contacting the atmospheric air. The outer tube 117c has a needle-like end which is capable of puncturing the insertion portion 115. An inner tube 117d is electrically connected to the metal lithium 117a to function as a terminal of the third electrode 117. The outer tube 117c is preferably provided with a stopper 117b with which the depth of the insertion of the third electrode 117 is controlled.

Figure 2A:
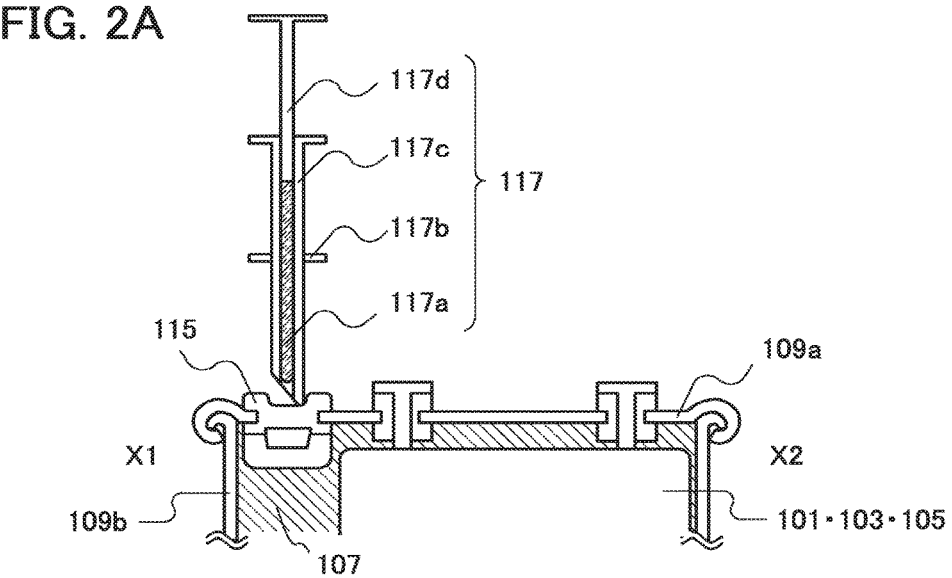
FIGS. 2A to 2C illustrate a method for restoring a capacity of a secondary battery of one embodiment of the present invention.
Figure 2B:
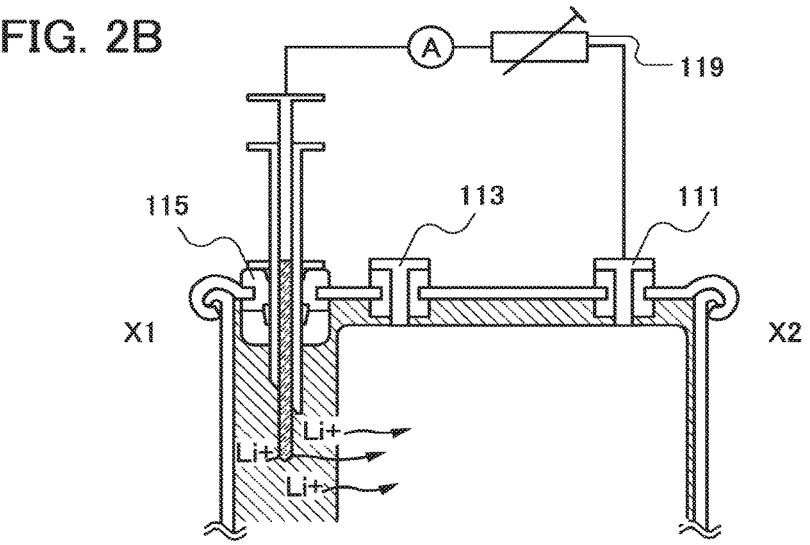

Then, as shown in FIG. 2B, the third electrode 117 is inserted through the insertion portion 115, and the inner tube 117d is pressed downward, whereby the metal lithium 117a and the electrolyte solution 107 are made to be in contact with each other. Furthermore, the third electrode 117 and the negative electrode terminal 111 are electrically connected to each other via a resistor 119. Thus, lithium ions are dissolved in the electrolyte solution 107 from the metal lithium 117a of the third electrode 117 and supplied to the negative electrode 105.

By the supply of lithium ions from the metal lithium 117a to the negative electrode 105, the amount of lithium in the whole of the secondary battery 100 can be increased, so that the capacity of the secondary battery 100 can be restored.

The resistor 119 preferably includes a semi-fixed resistor. An ammeter is preferably connected between the third electrode 117 and the negative electrode terminal 111 to monitor a current between the third electrode 117 and the negative electrode terminal 111. The current is greatly lowered as time passes from the start of the supply of lithium ions. The supply of lithium ions is preferably completed when the current between the third electrode 117 and the negative electrode terminal 111 reaches a predetermined value (e.g., approximately a tenth of a current value at the start of the supply of lithium ions).

Figure 2C:
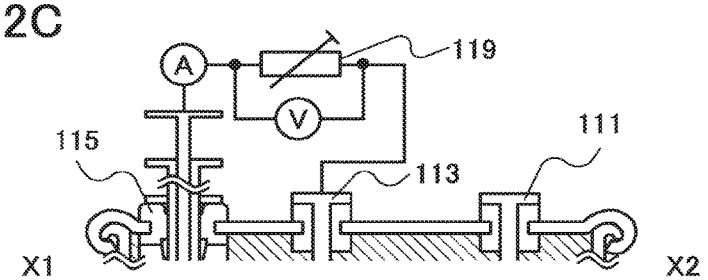

As shown in FIG. 2C, the third electrode 117 and the positive electrode terminal 113 may be electrically connected to each other via the resistor 119, whereby lithium ions are dissolved in the electrolyte solution 107 from the metal lithium 117a of the third electrode 117 and supplied to the positive electrode 101. Accordingly, in a similar manner, the amount of lithium in the whole of the secondary battery 100 can be increased, and the capacity of the secondary battery 100 can be restored. In the case where lithium ions are supplied to the positive electrode 101, a voltmeter is preferably provided between the third electrode 117 and the positive electrode 101. The supply of lithium ions to the positive electrode 101 is preferably completed when a voltage between the third electrode 117 and the positive electrode 101 reaches a predetermined value (e.g., 2 V or lower).

Note that, generally, a potential difference between the positive electrode 101 and the metal lithium 117a is larger than a potential difference between the negative electrode 105 and the metal lithium 117a. Thus, the supply of lithium ions takes a shorter time in the case of supplying lithium ions to the positive electrode 101 as shown in FIG. 2C than in the case of supplying lithium ions to the negative electrode 105 as shown in FIG. 2B. For example, in the case of supplying lithium ions to the negative electrode 105, the third electrode 117 needs to be continuously inserted for 5 to 10 hours because an estimated charging rate thereof is approximately 0.1 C to 0.2 C. In contrast, in the case of supplying lithium ions to the positive electrode 101, the third electrode 117 needs to be inserted for only approximately 1 hour because an estimated charging rate thereof is approximately 1 C.

When the secondary battery 100 has a large capacity, a protection circuit is preferably provided between the third electrode 117 and one of the negative electrode terminal 111 and the positive electrode terminal 113 to prevent the supply of an excess amount of lithium ions.

<Variations of Third Electrode>

Figure 3A:
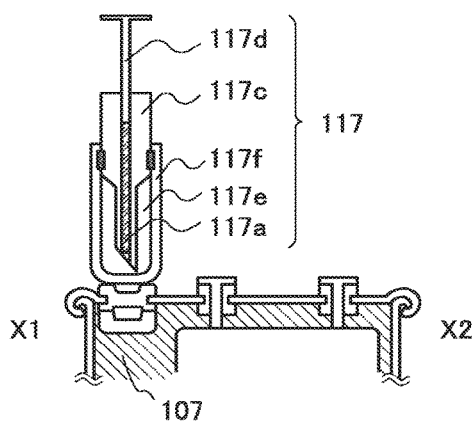
FIGS. 3A to 3D illustrate a secondary battery of one embodiment of the present invention and a method for restoring a capacity of the secondary battery.

Note that the third electrode 117 is not limited to the structure shown in FIGS. 2A to 2C. For example, as shown in FIG. 3A, the third electrode 117 may include a cover 117f for covering the end of the outer tube 117c. The inside of the cover 117f is preferably filled with an inert gas 117e to suppress deterioration of the metal lithium 117a. Argon or the like can be used for the inert gas 117e. The cover 117f is preferably formed using a material having elasticity, more preferably formed using a material having both elasticity and a water vapor barrier property. As the material of the cover 117f, a various kinds of synthetic rubber such as silicone rubber, natural rubber, polypropylene, or poly(vinyl chloride), or a composite material of any of these can be used.

Figure 3B:
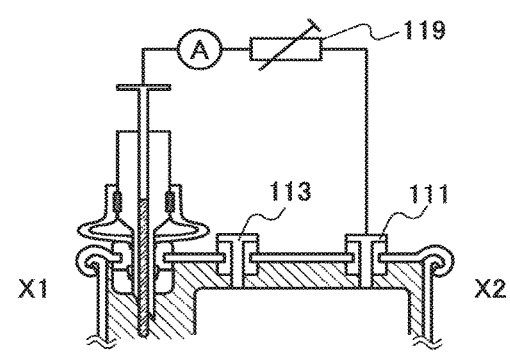

The third electrode 117 shown in FIG. 3A is inserted through the insertion portion 115 and the inner tube 117d is pressed downward as shown in FIG. 3B, whereby the metal lithium 117a and the electrolyte solution 107 are made to be in contact with each other. The third electrode 117 and one of the negative electrode terminal 111 and the positive electrode terminal 113 are electrically connected to each other via the resistor 119. Thus, lithium ions can be dissolved in the electrolyte solution 107 from the metal lithium 117a of the third electrode 117 and supplied to the negative electrode 105 or the positive electrode 101.

Figure 3C:
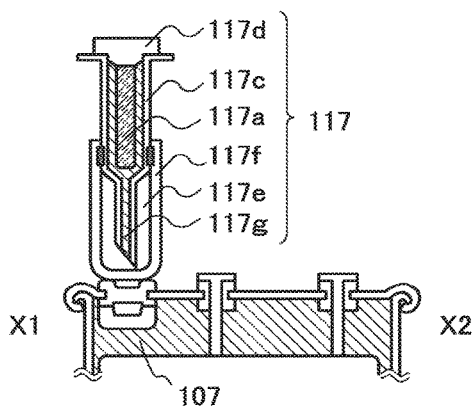
Figure 3D:
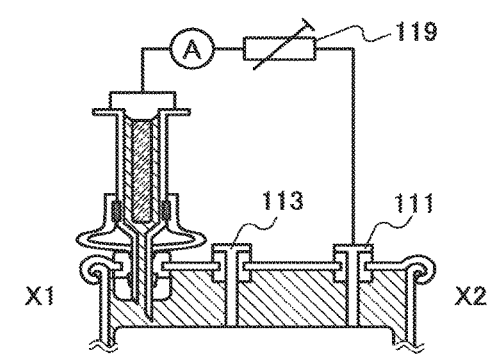

As shown in FIG. 3C, the inside of the outer tube 117c of the third electrode 117 may be filled with an electrolyte solution 117g. With the third electrode 117 having such a structure, the metal lithium 117a and the electrolyte solution 107 of the secondary battery 100 can be made to be in contact with each other as shown in FIG. 3D without moving the inner tube 117d, so that lithium ions can be supplied to the negative electrode 105 or the positive electrode 101. In addition, a space required for the insertion of the third electrode 117 is reduced; accordingly, a space for the positive electrode 101, the separator 103, and the negative electrode 105 can be increased.

<Replacement of Electrolyte Solution>

Lithium ions are supplied by inserting the third electrode 117 through the insertion portion 115. Furthermore, the electrolyte solution 107 may be supplied or replaced through the insertion portion 115. The capacity of the secondary battery 100 can be restored also by the supply or the replacement of the electrolyte solution 107.

Although there is no particular limitation on a method for replacing the electrolyte solution, a syringe having a needle-like end similar to that of the third electrode 117 may be used to expel and inject the electrolyte solution, for example.

Figure 4A:
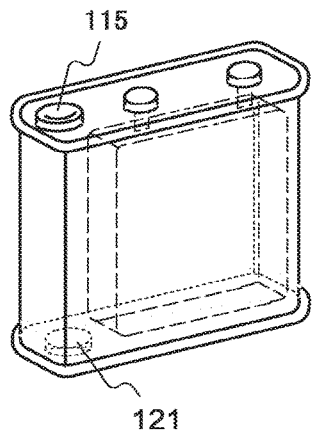
FIGS. 4A to 4E illustrate a secondary battery of one embodiment of the present invention.

In order to replace the electrolyte solution 107 easily, the exterior body 109 may be provided with an electrolyte solution injection and expelling portion 121 in addition to the insertion portion 115, as shown in FIG. 4A. With such a structure, the electrolyte solution can be expelled through one of the insertion portion 115 and the electrolyte solution injection and expelling portion 121, and the electrolyte solution can be injected through the other.

Figure 4B:
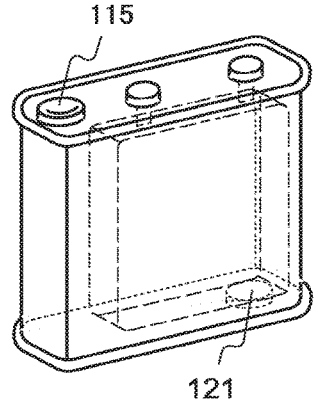

The position of the electrolyte solution injection and expelling portion. 121 is not limited to the position shown in FIG. 4A. For example, the electrolyte solution injection and expelling portion 121 may be provided diagonal to the insertion portion 115 as shown in FIG. 4B.

Figure 4C:
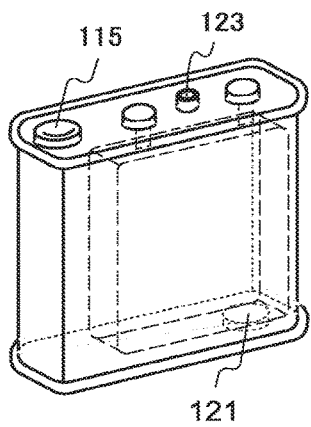

As shown in FIG. 4C, the exterior body 109 may be provided with a gas injection and expelling valve 123. An inert gas is injected into the secondary battery 100 through the gas injection and expelling valve 123. With the pressure of the inert gas, an electrolyte solution can be expelled through one of the insertion portion 115 and the electrolyte solution injection and expelling portion 121. An electrolyte solution can be injected through the other, and a gas can be expelled through the gas injection and expelling valve 123.

Figure 4D:
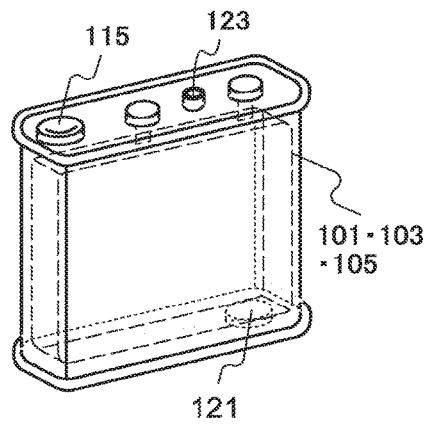

In the case where a space required for the insertion of the third electrode can be small, for example, in the case of using the third electrode 117 as shown in FIG. 3D, a space for the positive electrode 101, the separator 103, and the negative electrode 105 can be increased accordingly as shown in FIG. 4D.

Figure 4E:
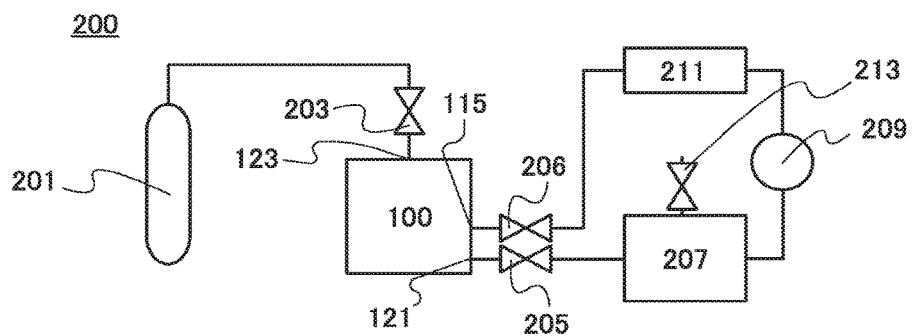

An electrolyte solution which has deteriorated may be expelled through the insertion portion 115 or the electrolyte solution injection and expelling portion 121 and injected again after filtration or the like. FIG. 4E illustrates an example of an electrolyte solution filtration system 200.

The filtration system 200 includes a tank 201, a server 207, a pump 209, and a filter 211. When the electrolyte solution 107 of the secondary battery 100 needs to be replaced because of deterioration, the tank 201 is connected to the gas injection and expelling valve 123 of the secondary battery 100. The electrolyte solution injection and expelling portion 121 is connected to the server 207. The insertion portion 115 is connected to the filter 211. These connections are made via respective valves 203, 205, and 206. The valve 205 connecting the electrolyte solution injection and expelling portion 121 and the server 207 and the valve 206 connecting the insertion portion 115 and the filter 211 are preferably one-way valves in order to prevent the electrolyte solution from flowing backward. The server 207 is preferably provided with a valve 213 for pressure adjustment.

The electrolyte solution 107 can be replaced in the following manner, for example. First, a gas in the tank 201 is injected into the exterior body 109, so that the electrolyte solution 107 in the exterior body 109 is expelled to the server 207 with the pressure of the gas. The electrolyte solution expelled to the server 207 passes through the filter 211 via the pump 209. The filter 211 can remove an unnecessary substance (e.g., particles which are separated from the positive electrode 101 or the negative electrode 105 and do not contribute to charge and discharge, a polymerized substance of an organic solvent included in the electrolyte solution, or the like) from an electrolyte solution which has deteriorated. After passing through the filter 211, the electrolyte solution is injected into the exterior body 109 again. The gas in the exterior body 109 at this time is expelled through the gas injection and expelling valve 123.

Although not shown, the electrolyte solution having passed through the filter 211 may be injected into the exterior body 109 after being mixed with a new electrolyte solution, a new electrolyte, or a new solvent.

<Separator>

In order to increase the diffusibility of lithium ions, the separator 103 of the secondary battery 100 preferably includes a groove having a surface parallel to a surface of the positive electrode 101 and a surface of the negative electrode 105. Examples of the structure of the separator 103 are described with reference to FIGS. 5A to 5G. The separator has minute pores, projected portions, or depressed portions.

Figure 5A:
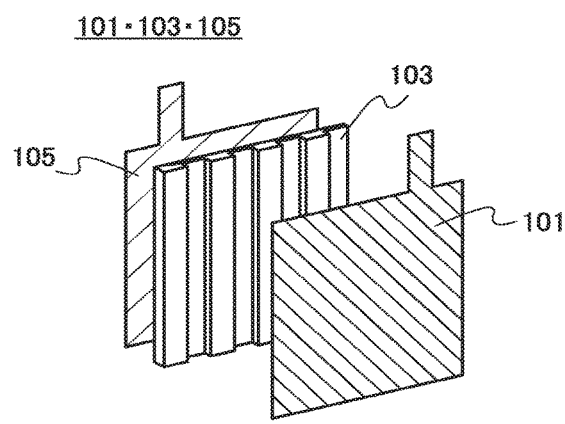
FIGS. 5A to 5G illustrate a secondary battery of one embodiment of the present invention.
Figure 5B:
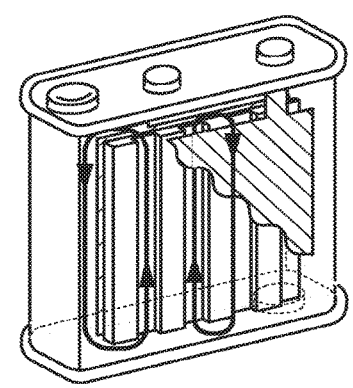

FIG. 5A illustrates the positive electrode 101, the negative electrode 105, and the separator 103 between the positive electrode 101 and the negative electrode 105. The secondary battery 100 having this structure is assumed to be installed such that the largest surfaces of the positive electrode 101 and the negative electrode 105 are perpendicular to a horizontal surface, for example, as shown in FIG. 5B. The secondary battery 100 may be installed horizontally.

It is effective to increase the capability of the electrolyte solution 107 to transfer lithium ions in increasing the diffusibility of lithium ions. Furthermore, heat is generated from the positive electrode 101 and the negative electrode 105 by charge and discharge of the secondary battery 100. As the capacity or output of the secondary battery 100 increases, the amount of heat generation increases; excessive heat might accelerate deterioration of the electrolyte solution.

The secondary battery 100 including the separator 103 having a plurality of grooves as shown in FIG. 5A is effective in improving the capability to transfer lithium ions or in releasing heat. In other words, the separator has a projected portion between the grooves as shown in FIG. 5A. The groove in the separator 103 is larger than the minute pore which is provided in the separator. The grooves in the separator 103 are provided in the form of stripes by pressing or the like. The grooves in the separator 103 are provided on the side close to the positive electrode 101. The grooves in the separator 103 promote convection in the electrolyte solution as indicated by arrows in FIG. 5B, for example. Specifically, the electrolyte solution heated by the positive electrode 101 and the negative electrode 105 moves upward along the grooves in the separator 103 to the vicinity of the exterior body 109. The electrolyte solution 107 in the vicinity of the exterior body 109 is cooled down and moves downward along the inner wall of the exterior body 109. In other words, the grooves in the separator 103 serve as flow paths for the electrolyte solution.

By promotion of convection in the electrolyte solution 107 in the above manner, the diffusibility of lithium ions is improved. Furthermore, by promotion of convection in the electrolyte solution 107, the release of heat is promoted, and the temperature of the separator is made uniform. Thus, deposition of a lithium metal can be suppressed. By promotion of release of heat, deterioration of the electrolyte solution can be suppressed.

With the grooves serving as flow paths of the electrolyte solution, the electrolyte solution 107 can be replaced more smoothly in the case of replacing the electrolyte solution 107.

FIGS. 5C to 5G illustrate other examples of the structure of the separator 103.

Figure 5C:
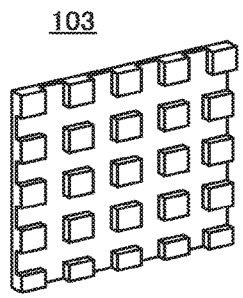
Figure 5D:
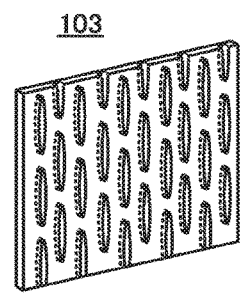
Figure 5E:
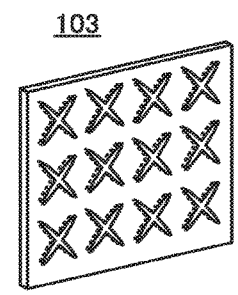
Figure 5F:
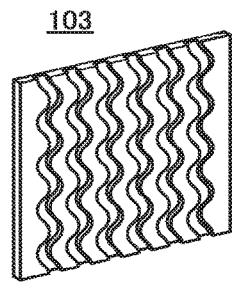
Figure 5G:
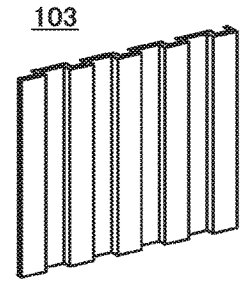

In FIG. 5A, the groove in the separator 103 is formed so that the longitudinal direction of the groove is perpendicular to the horizontal surface, but the structure of the separator 103 is not limited thereto. As shown in FIG. 5C, the separator 103 may have a plurality of grooves in a perpendicular direction and a plurality of grooves in a horizontal direction that cross each other. The separator 103 may have a plurality of depressed portions as shown in FIGS. 5D and 5E. The separator 103 may have a plurality of serpentine grooves as shown in FIG. 5F. The separator 103 may have a plurality of grooves on both sides as shown in FIG. 5G. Furthermore, a separator having a structure formed by a combination of any of the above-described characteristics may be used.

Note that the grooves or depressed portions of the separator 103, i.e., the flow paths for the electrolyte solution 107, are preferably formed so as to be perpendicular to an installation direction of the secondary battery 100, in which case the grooves or depressed portions are more effective in promoting convection.

Although FIGS. 5A to 5G illustrate examples in which the separator 103 is provided with grooves or depressed portions, one embodiment of the present invention is not limited to these examples. In some cases or depending on the situation, the separator 103 may have a flat plate shape without grooves or depressed portions.

<Electrode>

Figure 6A:
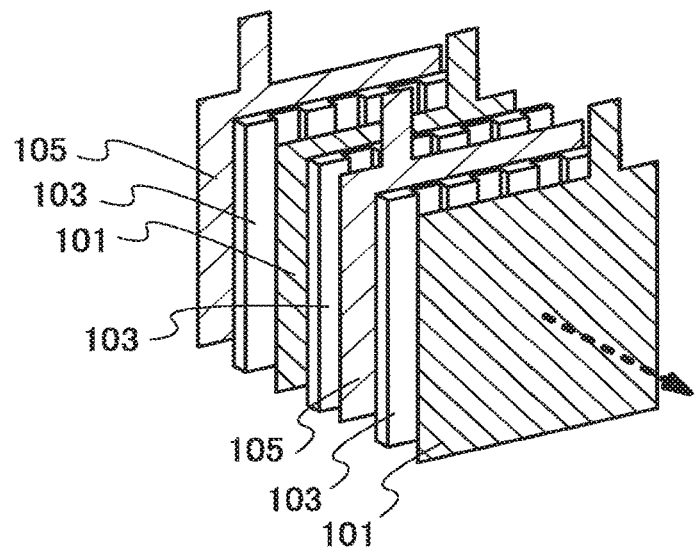
FIGS. 6A and 6B illustrate a method for restoring a capacity of a secondary battery of one embodiment of the present invention.

Examples of the shape of the positive electrode 101 and the shape of the negative electrode 105 that are included in the secondary battery 100 are described with reference to FIGS. 6A and 6B.

In order to increase the capacity of the secondary battery 100, the area of the positive electrode 101 and the area of the negative electrode 105 are preferably large. For example, as shown in FIG. 6A, a plurality of positive electrodes 101 and a plurality of negative electrodes 105 may be stacked with each other with separators 103 provided therebetween. The structure including a stack of the plurality of electrodes can suppress separation of an active material from a current collector due to expansion and shrink at the time when the active material occludes and releases lithium ions.

Figure 6B:
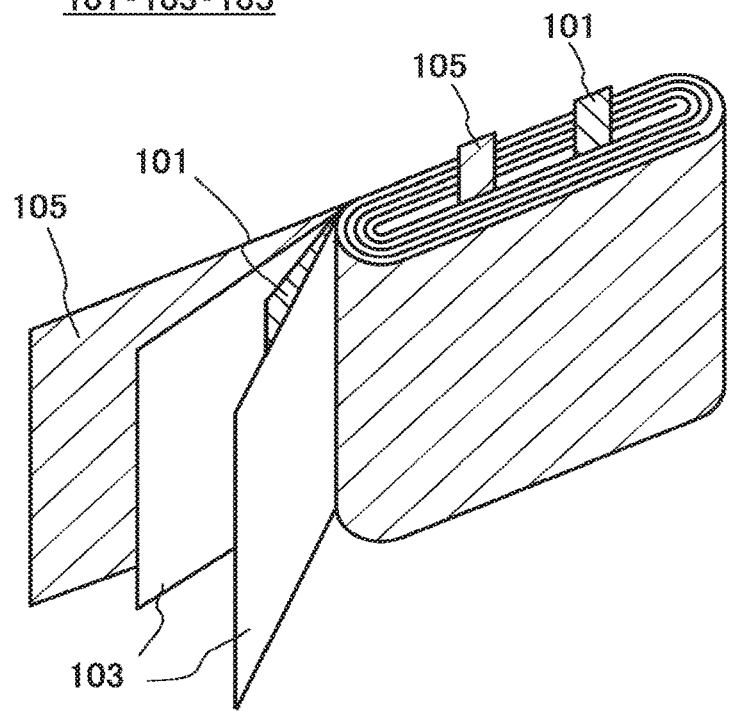

As shown in FIG. 6B, the positive electrode 101, the negative electrode 105, and the separators 103 that are long and thin may be wound. The wound electrodes can be manufactured by a simple process.

(Embodiment 2)

In this embodiment, examples of components including the positive electrode 101, the negative electrode 105, the electrolyte solution 107, and the separator 103 of the non-aqueous secondary battery 100 of one embodiment of the present invention are described.

<Positive Electrode>

First, the positive electrode 101 is described.

The positive electrode 101 includes a positive electrode current collector and a positive electrode active material layer formed over the positive electrode current collector by a coating method, a CVD method, a sputtering method, or the like, for example.

The positive electrode current collector can be formed using a material that has high conductivity and is not alloyed with lithium, such as a metal typified by stainless steel, gold, platinum, zinc, iron, copper, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector can have a foil shape, a plate (sheet) shape, a net shape, a punching-metal shape, an expanded-metal shape, or the like as appropriate. The positive electrode current collector preferably has a thickness of greater than or equal to 10 μm and less than or equal to 30 μm.

The positive electrode active material layer at least includes the positive electrode active material, a conductive additive, and a binder.

Examples of the conductive additive are acetylene black (AB), ketjen black, graphite (black lead) particles, and carbon nanotubes in addition to graphene described later.

The positive electrode active material is in the form of particles made of secondary particles having average particle diameter and particle diameter distribution, which is obtained in such a way that material compounds are mixed at a predetermined ratio and baked and the resulting baked product is crushed, granulated, and classified by an appropriate means.

As the positive electrode active material, a material into/from which lithium ions can be inserted and extracted is used.

For example, an olivine-type lithium-containing material ($LiMPO_4$ (general formula) (M is one or more of Fe(II), Mn(II), Co(II), and Ni(II))) can be used. Typical examples of the general formula $LiMPO_4$ are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a composite oxide material such as $Li_{(2-j)}MSiO_4$ (general formula) (M is one or more of Fe(II), Mn(II), Co(II), and Ni(II); 0≤j≤2) may be used. Typical examples of the general formula $Li_{(2-j)}MSiO_4$ are compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Examples of a lithium-containing material with a layered rock-salt crystal structure which can be used for the positive electrode active material include a lithium cobalt oxide ($LiCoO_2$); $LiNiO_2$; $LiMnO_2$; $Li_2MnO_3$; an NiCo-based lithium-containing material (a general formula thereof is $LiNi_xCo_{1-x}O_2$ (0<x<1)) such as $LiNi_{0.8}Co_{0.2}O_2$; an NiMn-based lithium-containing material (a general formula thereof is $LiNi_xMn_{1-x}O_2$ (0<x<1)) such as $LiNi_{0.5}Mn_{0.5}O_2$; and an NiMnCo-based lithium-containing material (also referred to as NMC, and a general formula thereof is $LiNi_xMn_yCo_{1-x-y}O_2$ (x>0, y<0, x+y<1)) such as $LiNi_{1/3}Mn_{1/3}Co_{1/3}O_2$.

Further alternatively, any of other various compounds, such as an active material having a spinel crystal structure (e.g., $LiMn_2O_4$) and an active material having an inverse spinel crystal structure (e.g., $LiMVO_4$) can be used.

Still further alternatively, a solid solution containing any of the above materials as an end-member can be used.

Note that a carbon layer may be provided on a surface of the positive electrode active material. With a carbon layer, conductivity of an electrode can be increased. The positive electrode active material can be coated with the carbon layer by mixing a carbohydrate such as glucose at the time of baking the positive electrode active material.

In addition, the graphene which is added to the positive electrode active material layer as a conductive additive can be formed by performing reduction treatment on graphene oxide.

Here, graphene in this specification includes single-layer graphene or multilayer graphene including two to a hundred layers. Single-layer graphene refers to a one-atom-thick sheet of carbon molecules having π bonds. Graphene oxide refers to a compound formed by oxidation of such graphene. Note that when a graphene oxide is reduced to form a graphene, oxygen contained in the graphene oxide is not entirely released and part of oxygen remains in the graphene. When the graphene contains oxygen, the proportion of the oxygen, which is measured by X-ray photoelectron spectroscopy (XPS), is higher than or equal to 2 atomic % and lower than or equal to 20 atomic %, preferably higher than or equal to 3 atomic % and lower than or equal to 15 atomic %.

In the case where graphene is multilayer graphene including graphene obtained by reducing graphene oxide, the interlayer distance between graphenes is greater than or equal to 0.34 nm and less than or equal to 0.5 nm, preferably greater than or equal to 0.38 nm and less than or equal to 0.42 nm, more preferably greater than or equal to 0.39 nm and less than or equal to 0.41 nm. In general graphite, the interlayer distance of single-layer graphene is 0.34 nm. Since the interlayer distance in the graphene used for the secondary battery of one embodiment of the present invention is longer than that in the general graphite, lithium ions can easily transfer between layers of the graphene in the multilayer graphene.

Graphene oxide can be formed by an oxidation method called a Hummers method, for example.

Note that graphene oxide has an epoxy group, a carbonyl group, a carboxyl group, a hydroxyl group, or the like. In graphene oxide in a polar solvent typified by NMP (also referred to as N-methylpyrrolidone, 1-methyl-2-pyrrolidone, N-methyl-2-pyrrolidone, et cetera), oxygen in a functional group is negatively charged; therefore, while interacting with NMP, the graphene oxide repels other graphene oxide and is hardly aggregated. Accordingly, in a polar solvent, graphene oxides can be easily dispersed uniformly.

The length of one side (also referred to as a flake size) of the graphene oxide is greater than or equal to 50 nm and less than or equal to 100 μm, preferably greater than or equal to 800 nm and less than or equal to 20 μm.

Unlike a conductive additive in the form of particles such as acetylene black, which makes point contact with a positive electrode active material, the graphene is capable of surface contact with low contact resistance; accordingly, the electron conductivity between the particles of the positive electrode active material and the graphene can be improved without an increase in the amount of a conductive additive.

The solvent is removed by volatilization from a dispersion medium in which the graphene oxide is uniformly dispersed, and the graphene oxide is reduced to give graphene; hence, pieces of the graphene remaining in the positive electrode active material layer are partly overlapped with each other and dispersed such that surface contact is made, thereby a path for electron conduction can be formed.

Thus, when graphene is used as a raw material and reduction of graphene oxide is performed after formation of the electrode, graphene as a conductive additive is produced. Accordingly, the positive electrode active material layer with high electron conductivity can be formed.

The ratio of the positive electrode active material in the positive electrode active material layer can be increased because it is not necessary to increase the added amount of the conductive additive in order to increase contact points between the positive electrode active material and the graphene. Accordingly, the discharge capacity of the secondary battery can be increased.

The average particle diameter of the primary particle of the positive electrode active material is less than or equal to 500 nm, preferably greater than or equal to 50 nm and less than or equal to 500 nm. To make surface contact with the plurality of particles of the positive electrode active material, the length of one side of the graphene is greater than or equal to 50 nm and less than or equal to 100 μm, preferably greater than or equal to 800 nm and less than or equal to 20 μm.

Examples of the binder included in the positive electrode active material layer are polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, and nitrocellulose, in addition to polyvinylidene fluoride (PVDF) which is a typical example.

In the case where graphene is used as the conductive additive, it is preferable that the proportions of the positive electrode active material, the graphene as the conductive additive, and the binder with respect to the total weight of the positive electrode active material layer be greater than or equal to 90 wt % and less than or equal to 94 wt %, greater than or equal to 1 wt % and less than or equal to 5 wt %, and greater than or equal to 1 wt % and less than or equal to 5 wt %, respectively.

<Negative Electrode>

Next, the negative electrode 105 of the secondary battery 100 will be described.

The negative electrode 105 includes a negative electrode current collector and a negative electrode active material layer formed over the negative electrode current collector by a coating method, a CVD method, a sputtering method, or the like, for example.

The negative electrode current collector can be formed using a material that has high conductivity and that is not alloyed with a carrier ion such as a lithium, ion, e.g., stainless steel, gold, platinum, zinc, iron, copper, or titanium, or an alloy thereof. Alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The negative electrode current collector can have a foil shape, a plate (sheet) shape, a net shape, a punching-metal shape, an expanded-metal shape, or the like as appropriate. The negative electrode current collector preferably has a thickness of greater than or equal to 10 μm and less than or equal to 30 μm.

The negative electrode active material layer includes at least a negative electrode active material. Further, a conductive additive may be also included.

There is no particular limitation on the material of the negative electrode active material as long as it is a material with which a metal can be dissolved and deposited or a material into/from which metal ions can be inserted and extracted. As the negative electrode active material, graphite, which is a carbon material generally used in the field of power storage, can be used as well as metal lithium. Examples of graphite include low crystalline carbon such as soft carbon and hard carbon and high crystalline carbon such as natural graphite, kish graphite, pyrolytic graphite, pyrolytic graphite, mesophase pitch based carbon fiber, mesocarbon microbeads (MCMB), mesophase pitches, petroleum-based coke, and coal-based coke.

As the negative electrode active material, other than the above carbon materials, an alloy-based material which enables a charge-discharge reaction by an alloying and dealloying reaction with carrier ions can be used. In the case where carrier ions are lithium ions, for example, a material containing at least one of Mg, Ca, Al, Si, Ge, Sn, Pb, As, Sb, Bi, Ag, Au, Zn, Cd, Hg, In, etc. can be used. Such metals have higher capacity than carbon. In particular, silicon has a significantly high theoretical capacity of 4200 mAh/g. For this reason, silicon is preferably used as the negative electrode active material.

The negative electrode active material layer may be formed by a coating method in such a manner that a conductive additive and a binder are added to the negative electrode active material to form a negative electrode paste and the negative electrode paste is applied onto the negative electrode current collector and dried.

Note that the negative electrode active material layer may be predoped with lithium. As a predoping method, a sputtering method may be used to form a lithium layer on a surface of the negative electrode active material layer.

Alternatively, the negative electrode active material layer can be predoped with lithium by providing lithium foil on the surface thereof.

Further, graphene is preferably formed on a surface of the negative electrode active material. In the case of using silicon as the negative electrode active material, the volume of silicon is greatly changed by occlusion and release of carrier ions in charge-discharge cycles. Therefore, adhesion between the negative electrode current collector and the negative electrode active material layer is decreased, resulting in degradation of battery characteristics caused by charging and discharging. In view of this, graphene is preferably formed on a surface of the negative electrode active material containing silicon because even when the volume of silicon is changed in charge-discharge cycles, decrease in adhesion between the negative electrode current collector and the negative electrode active material layer can be regulated, which makes it possible to reduce degradation of battery characteristics.

Graphene formed on the surface of the negative electrode active material can be formed by reducing graphene oxide in a similar manner to that of the method for forming the positive electrode. As the graphene oxide, the above-described graphene oxide can be used.

Further, a coating film of oxide or the like may be formed on the surface of the negative electrode active material. A coating film formed by decomposition or the like of an electrolyte solution or the like in charging cannot release electric charges used at the formation, and therefore forms irreversible capacity. In contrast, the coating film of oxide or the like provided on the surface of the negative electrode active material in advance can reduce or prevent generation of irreversible capacity.

As the film coating the negative electrode active material, an oxide film of any one of niobium, titanium, vanadium, tantalum, tungsten, zirconium, molybdenum, hafnium, chromium, aluminum, and silicon or an oxide film containing any one of these elements and lithium can be used. Such a film is denser than a conventional film formed on a surface of a negative electrode due to a decomposition product of an electrolyte solution.

For example, niobium oxide ($Nb_2O_5$) has a low electric conductivity of $10^{-9}$ S/cm$^2$ and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ cm$^2$/sec and high lithium ion conductivity. Therefore, niobium oxide can transmit lithium ions.

A sol-gel method can be used to coat the negative electrode active material with the coating film, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film can be formed on the surface of the negative electrode active material.

The use of the coating film can prevent a decrease in the capacity of the secondary battery.

<Electrolyte Solution>

As a solvent for the electrolyte solution 107 used in the secondary battery 100, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

With the use of a gelled high-molecular material as the solvent of the electrolyte solution, safety against liquid leakage and the like is improved. Further, a secondary battery can be thinner and more lightweight. Typical examples of the high-molecular material are silicone, polyacrylamide, polyacrylonitrile, polyethylene oxide, polypropylene oxide, a fluorine-based polymer, and the like.

Alternatively, the use of one or more of ionic liquids (room temperature molten salts) which are less likely to burn and volatilize as the solvent for the electrolytic solution can prevent the secondary battery from exploding or catching fire even when the secondary battery internally shorts out or the internal temperature increases due to overcharging or the like.

As an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$, or two or more of these lithium salts in an appropriate combination in an appropriate ratio.

As the electrolyte of the electrolyte solution, a material containing lithium ions serving as carrier ions is used. Typical examples of the electrolyte include lithium salts such as $LiClO_4$, $LiAsF_6$, $LiBF_4$, $LiPF_6$, and $Li(C_2F_5SO_2)_2N$.

Instead of the electrolytic solution, a solid electrolyte including an inorganic material such as a sulfide-based inorganic material or an oxide-based inorganic material, or a solid electrolyte including a high-molecular material such as a polyethylene oxide (PEO)-based high-molecular material may alternatively be used. When the solid electrolyte is used, it is not necessary to provide a separator. Further, the battery can be entirely solidified; therefore, there is no possibility of liquid leakage and thus the safety of the battery is dramatically increased.

<Separator>

As a separator of the secondary battery, a porous insulator such as cellulose, polypropylene (PP), polyethylene (PE), polybutene, nylon, polyester, polysulfone, polyacrylonitrile, polyvinylidene fluoride, or tetrafluoroethylene can be used. Alternatively, nonwoven fabric of a glass fiber or the like, or a diaphragm, in which a glass fiber and a polymer fiber are mixed may be used.

(Embodiment 3)

The secondary battery of one embodiment of the present invention can be used as a power source and a power storage device for a variety of electrical devices. The electrical devices may each include a secondary battery or may be connected wirelessly or with a wiring to one or more secondary batteries and a control device controlling power systems of these devices to form a power system network (electric power network). The electric power network controlled by the control device can improve usage efficiency of electric power in the whole network.

Figure 7:
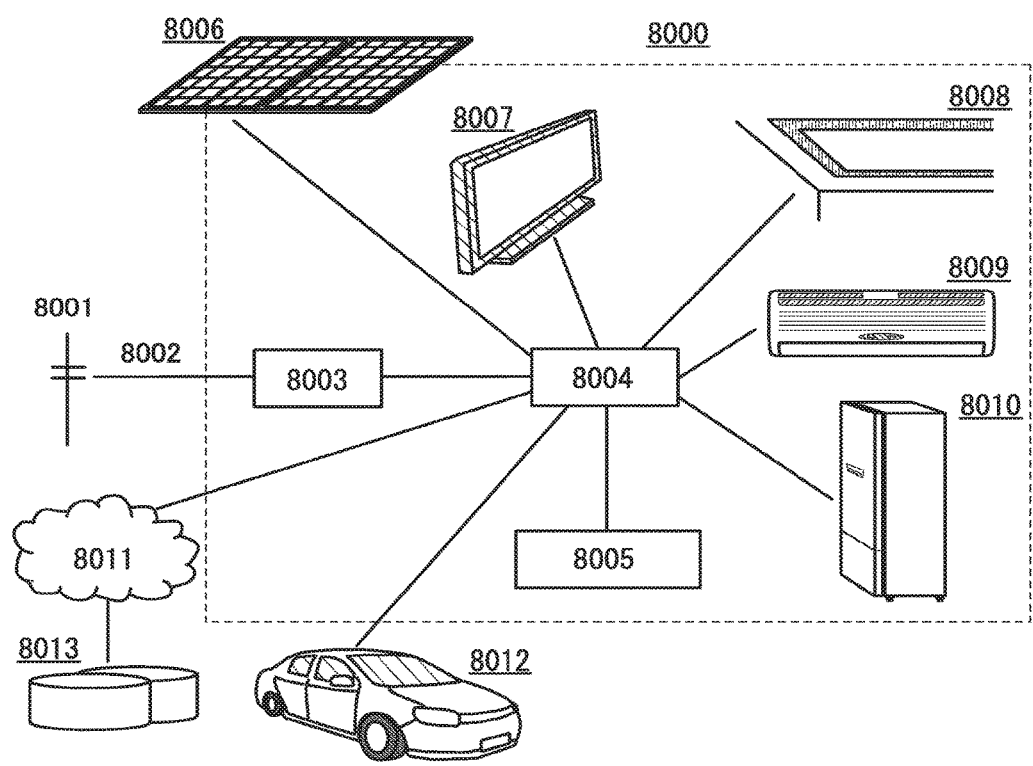
FIG. 7 illustrates an electrical device and a power storage device.

FIG. 7 illustrates an example of a home energy management system (HEMS) in which a plurality of home appliances, a control device, a secondary battery, and the like are connected in a house. Such a system makes it possible to check easily the power consumption of the whole house. In addition, the plurality of home appliances can be operated with a remote control. Further, automatic control of the home appliances with a sensor or the control device can also contribute to low power consumption.

A panelboard 8003 set in a house 8000 is connected to an electric power system 8001 through a service wire 8002. The panelboard 8003 supplies AC power which is electric power supplied from a commercial power source through the service wire 8002 to each of the plurality of home appliances. A control device 8004 is connected to the panelboard 8003 and also connected to the plurality of home appliances, a power storage system 8005, a solar power generation system 8006, and the like. Further, the control device 8004 can also be connected to an electric vehicle 8012 which is parked outside the house 8000 or the like and operates independently of the panelboard 8003.

The control device 8004 connects the panelboard 8003 to the plurality of home appliances to form a network, and controls the plurality of home appliances connected to the network.

In addition, the control device 8004 is connected to Internet 8011 and thus can be connected to a management server 8013 through the Internet 8011. The management server 8013 receives data on the status of electric power usage of users and therefore can create a database and can provide the users with a variety of services based on the database. Further, as needed, the management server 8013 can provide the users with data on electric power charge for a corresponding time zone, for example. On the basis of the data, the control device 8004 can set an optimized usage pattern in the house 8000.

Examples of the plurality of home appliances are a display device 8007, a lighting device 8008, an air-conditioning system 8009, and an electric refrigerator 8010 which are illustrated in FIG. 7. However, it is needless to say that the plurality of home appliances are not limited to these examples and refer to a variety of electrical devices which can be set inside a house, such as the above-described electrical devices.

In a display portion of the display device 8007, a semiconductor display device such as a liquid crystal display device, a light-emitting device including a light-emitting element, e.g., an organic electroluminescent (EL) element, in each pixel, an electrophoretic display device, a digital micromirror device (DMD), a plasma display panel (PDP), or a field emission display (FED) is provided, for example. A display device functioning as a display device for displaying information, such as a display device for TV broadcast reception, a personal computer, advertisement, and the like, is included in the category of the display device 8007.

The lighting device 8008 includes an artificial light source which generates light artificially by utilizing electric power in its category. Examples of the artificial light source are an incandescent lamp, a discharge lamp such as a fluorescent lamp, and a light-emitting element such as a light emitting diode (LED) and an organic EL element. Although being provided on a ceiling in FIG. 7, the lighting device 8008 may be installation lighting provided on a wall, a floor, a window, or the like or desktop lighting.

The air-conditioning system 8009 has a function of adjusting an indoor environment such as temperature, humidity, and air cleanliness. FIG. 7 illustrates an air conditioner as an example. The air conditioner includes an indoor unit in which a compressor, an evaporator, and the like are integrated and an outdoor unit (not illustrated) in which a condenser is incorporated, or an integral unit thereof.

The electric refrigerator 8010 is an electrical device for the storage of food and the like at low temperature and includes a freezer for freezing at 0° C. or lower. A refrigerant in a pipe which is compressed by a compressor absorbs heat when vaporized, and thus inside the electric refrigerator 8010 is cooled.

The plurality of home appliances may each include a secondary battery or may use electric power supplied from the power storage system 8005 or the commercial power source without including the secondary battery. By using a secondary battery as an uninterruptible power source, the plurality of home appliances each including the secondary battery can be used even when electric power cannot be supplied from the commercial power source due to power failure or the like.

In the vicinity of a terminal for power supply in each of the above-described home appliances, an electric power sensor such as a current sensor can be provided. Data obtained with the electric power sensor is sent to the control device 8004, which makes it possible for users to check the used amount of electric power of the whole house. In addition, on the basis of the data, the control device 8004 can determine the distribution of electric power supplied to the plurality of home appliances, resulting in the efficient or economical use of electric power in the house 8000.

In a time zone when the usage rate of electric power which can be supplied from the commercial power source is low, the power storage system 8005 can be charged with electric power from the commercial power source. Further, with the use of the solar power generation system 8006, the power storage system 8005 can be charged during the daytime. Note that an object to be charged is not limited to the power storage system 8005, and a secondary battery included in the electric vehicle 8012 and the secondary batteries included in the plurality of home appliances which are connected to the control device 8004 may each be the object to be charged.

Electric power stored in a variety of secondary batteries in such a manner is efficiently distributed by the control device 8004, resulting in the efficient or economical use of electric power in the house 8000.

As an example of controlling the electric power network, the example of controlling an electric power network on a house scale is described above; however, the scale of the electric power network is not limited thereto. An electric power network on an urban scale or a national scale (also referred to as a smart grid) can be created by a combination of a control device such as a smart meter and a communication network. Further, a microgrid which is on a scale of a factory or an office and includes an energy supply source and a plant consuming electric power as units can be constructed.

Next, an example of a power storage system in which the secondary battery of one embodiment of the present invention is used is described with reference to FIGS. 8A and 8B. A power storage system 8100 to be described here can be used at home as the power storage system 8005 described above. Here, the power storage system 8100 is described as a home-use power storage system as an example; however, it is not limited thereto and can also be used for business use or other uses.

Figure 8A:
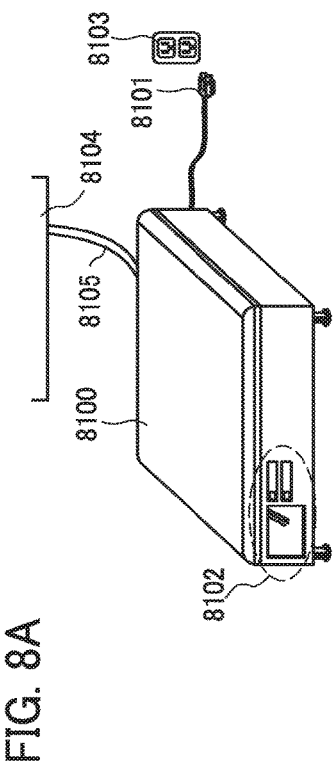
FIGS. 8A and 8B illustrate a power storage system.

As illustrated in FIG. 8A, the power storage system 8100 includes a plug 8101 for being electrically connected to a system power supply 8103. Further, the power storage system 8100 is electrically connected to a panelboard 8104 installed in home.

The power storage system 8100 may further include a display panel 8102 for displaying an operation state or the like, for example. The display panel may have a touch screen. In addition, the power storage system 8100 may include a switch for turning on and off a main power source, a switch to operate the power storage system, and the like as well as the display panel.

Although not illustrated, an operation switch to operate the power storage system 8100 may be provided separately from the power storage system 8100; for example, the operation switch may be provided on a wall in a room. Alternatively, the power storage system 8100 may be connected to a personal computer, a server, or the like provided in home, in order to be operated indirectly. Still alternatively, the power storage system 8100 may be remotely operated using the Internet, an information terminal such as a smartphone, or the like. In such cases, a mechanism that performs wired or wireless communication between the power storage system 8100 and other devices is provided in the power storage system 8100.

Figure 8B:
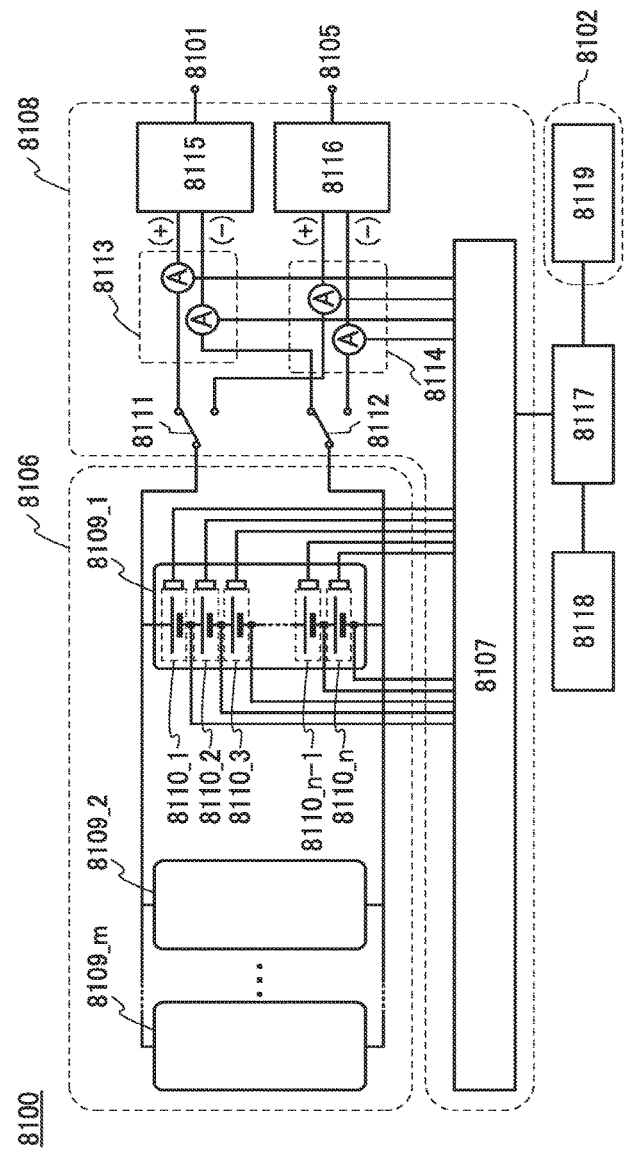

FIG. 8B illustrates an example of a circuit configuration of the power storage system 8100. The power storage system 8100 includes a secondary battery group 8106 and a battery management system (BMS) 8108.

In the secondary battery group 8106, m secondary battery units 8109_1 to 8109_m are connected in parallel. In each of the m secondary battery units 8109_1 to 8109_m, n secondary batteries 8110_1 to 8110_n are connected in series. The secondary battery of one embodiment of the present invention can be used as each of the secondary batteries 8110.

The BMS 8108 includes a battery management unit (BMU) 8107, and the BMU 8107 has functions of monitoring, controlling, and protecting the state of the secondary battery group 8106. For example, the BMU 8107 is electrically connected to the secondary batteries 8110_1 to 8110_n included in the secondary battery group 8106 and can collect cell voltage data. Each of the secondary batteries 8110_1 to 8110_n is provided with a thermistor so that the cell temperature data can be collected.

The BMS 8108 includes an AC-DC inverter 8115 and a DC-AC inverter 8116. The AC-DC inverter 8115 is electrically connected to a plug 8101, and the DC-AC inverter 8116 is electrically connected to an external connection terminal 8105. Charge and discharge of the power storage system 8100 are switched with a switch 8111 and a switch 8112. In storing power in the power storage system 8100, for example, AC power from the system power supply 8103 is converted into DC power, which is transmitted to the BMU 8107. In deriving power from the power storage system 8100, power stored in the secondary battery group 8106 is converted into AC power, which is supplied to an indoor load, for example. Note that the electric power may be supplied from the power storage system 8100 to the load through the panelboard 8104 as illustrated in FIG. 8A or may be directly supplied from the power storage system 8100 through wired or wireless transmission.

Note that a power source for charging the power storage system 8100 is not limited to the system power supply 8103 described above; for example, electric power may be supplied from a solar power generating system installed outside or a power storage system mounted on an electric vehicle.

The AC-DC inverter 8115 and the DC-AC inverter 8116 are connected to ammeters 8113 and 8114, and the BMU 8107 can collect data from the ammeters 8113 and 8114. Depending on these data, the BMU 8107 can monitor overcharge and overdischarge, monitor overcurrent, control a cell balancer, manage the deterioration condition of a battery, calculate the remaining battery level (the state of charge (SOC)), control a cooling fan of a driving secondary battery, or control detection of failure, for example.

The BMU 8107 is connected to a data logger 8117, and the data logger 8117 is connected to a ROM 8118. The data logger 8117 is connected to an alarm 8119 or the like, and information of the power storage system 8100 can be displayed on the display panel or the like 8102.

Note that the secondary batteries 8110_1 to 8110_m may have some of or all the functions, or the secondary battery units 8109_1 to 8109_m may have the functions.

Note that, as an electronic circuit included in the BMU 8107, an electronic circuit including the oxide semiconductor transistor described above is preferably provided. In this case, power consumption of the BMU 8107 can be significantly reduced.

This application is based on Japanese Patent Application serial no. 2013-102780 filed with Japan Patent Office on May 15, 2013, the entire contents of which are hereby incorporated by reference.

What is claimed is:

1. A method for restoring a capacity of a nonaqueous secondary battery,
    the nonaqueous secondary battery comprising:
    a positive electrode; a negative electrode;
    a separator between the positive electrode and the negative electrode;
    an electrolyte solution; and
    an exterior body surrounding the positive electrode, the negative electrode, the separator, and the electrolyte solution, the exterior body comprising an insertion portion, the method comprising the steps of:
    inserting a third electrode to the insertion portion, the third electrode comprising an outer tube, an inner tube inside the outer tube, and a metal lithium inside the outer tube; and
    connecting electrically the third electrode and one of the positive electrode and the negative electrode to supply a lithium ion from the third electrode to the one of the positive electrode and the negative electrode.

2. The method for restoring a capacity of a nonaqueous secondary battery according to claim 1, further comprising a step of detecting the capacity of the nonaqueous secondary battery before inserting the third electrode to the insertion portion.

3. The method for restoring a capacity of a nonaqueous secondary battery according to claim 1, further comprising a step of injecting or expelling the electrolyte solution via an injection and expelling portion of the exterior body.

4. The method for restoring a capacity of a nonaqueous secondary battery according to claim 1, wherein in the step of inserting the third electrode the insertion portion, part of the outer tube and part of the metal lithium are inserted an inside of the exterior body.

5. The method for restoring a capacity of a nonaqueous secondary battery according to claim 1, wherein the outer tube is configured to prevent the metal lithium from contacting an air.

6. The method for restoring a capacity of a nonaqueous secondary battery according to claim 4, wherein in the step of inserting the third electrode to the insertion portion, the metal lithium is injected from the outer tube by pressing the inner tube.

7. A method for restoring a capacity of a nonaqueous secondary battery,
the nonaqueous secondary battery comprising:
a positive electrode; a negative electrode;
a separator between the positive electrode and the negative electrode;
an electrolyte solution; and
an exterior body surrounding the positive electrode, the negative electrode, the separator, and the electrolyte solution, the exterior body comprising an insertion portion, the method comprising the steps of:
detecting the capacity of the nonaqueous secondary battery;
inserting a third electrode to the insertion portion, the third electrode comprising an outer tube and a metal lithium inside the outer tube; and
connecting electrically the third electrode and one of the positive electrode and the negative electrode to supply a lithium ion from the third electrode to the one of the positive electrode and the negative electrode.

8. The method for restoring a capacity of a nonaqueous secondary battery according to claim 7, further comprising a step of injecting or expelling the electrolyte solution via an injection and expelling portion of the exterior body.

9. The method for restoring a capacity of a nonaqueous secondary battery according to claim 7, in the step of inserting the third electrode to the insertion portion, part of the outer tube and part of the metal lithium are inserted an inside of the exterior body.

10. The method for restoring a capacity of a nonaqueous secondary battery according to claim 9, wherein the outer tube is configured to prevent the metal lithium from contacting an air.

11. The method for restoring a capacity of a nonaqueous secondary battery according to claim 9,
wherein the third electrode further comprises an inner tube provided inside the outer tube and in contact with the metal lithium, and
wherein in the step of inserting the third electrode to the insertion portion, the metal lithium is injected from the outer tube by pressing the inner tube.

12. The method for restoring a capacity of a nonaqueous secondary battery according to claim 7,
wherein an ammeter is connected between the third electrode and the negative electrode to monitor a current between the third electrode and the negative electrode, and
wherein the supply of the lithium ion is completed when the current between the third electrode and the negative electrode reaches a predetermined value.

13. A method for restoring a capacity of a nonaqueous secondary battery,
the nonaqueous secondary battery comprising:
a positive electrode; a negative electrode;
a separator between the positive electrode and the negative electrode;
an electrolyte solution; and
an exterior body surrounding the positive electrode, the negative electrode, the separator, and the electrolyte solution, the exterior body comprising an insertion portion, the method comprising the steps of:
inserting a third electrode to the insertion portion, the third electrode comprising an outer tube and a metal lithium inside the outer tube; and
connecting electrically the third electrode and one of the positive electrode and the negative electrode via a resistor to supply a lithium ion from the third electrode to the one of the positive electrode and the negative electrode.

14. The method for restoring a capacity of a nonaqueous secondary battery according to claim 13, further comprising a step of detecting the capacity of the nonaqueous secondary battery before inserting the third electrode to the insertion portion.

15. The method for restoring a capacity of a nonaqueous secondary battery according to claim 13, further comprising a step of injecting or expelling the electrolyte solution via an injection and expelling portion of the exterior body.

16. The method for restoring a capacity of a nonaqueous secondary battery according to claim 13, wherein in the step of inserting the third electrode to the insertion portion, part of the outer tube and part of the metal lithium are inserted an inside of the exterior body.

17. The method for restoring a capacity of a nonaqueous secondary battery according to claim 16, wherein the outer tube is configured to prevent the metal lithium from contacting an air.

18. The method for restoring a capacity of a nonaqueous secondary battery according to claim 16,
wherein the third electrode further comprises an inner tube provided inside the outer tube and in contact with the metal lithium, and
wherein in the step of inserting the third electrode to the insertion portion, the metal lithium is injected from the outer tube by pressing the inner tube.

19. The method for restoring a capacity of a nonaqueous secondary battery according to claim 13,
wherein an voltmeter is provided between the third electrode and the positive electrode, and
wherein the supply of the lithium ion to the positive electrode is completed when a voltage between the third electrode and the positive electrode reaches a predetermined value.

20. The method for restoring a capacity of a nonaqueous secondary battery according to claim 7,
wherein a voltmeter is provided between the third electrode and the positive electrode, and
wherein the supply of the lithium ion to the positive electrode is completed when a voltage between the third electrode and the positive electrode reaches a predetermined value.

21. The method for restoring a capacity of a nonaqueous secondary battery according to claim 13,
wherein an ammeter is connected between the third electrode and the negative electrode to monitor a current between the third electrode and the negative electrode, and
wherein the supply of the lithium ion is completed when the current between the third electrode and the negative electrode reaches a predetermined value.

* * * * *